US005947441A

United States Patent [19]

Zenker et al.

[11] Patent Number: 5,947,441

[45] Date of Patent: Sep. 7, 1999

[54] TWO-WAY SEAT-TYPE VALVE

[75] Inventors: Siegfried Zenker, Kirchseeon, Germany; Jens Jørgen Nielsen, Broager; Erik Plauborg, Sønderborg, both of Denmark

[73] Assignee: Danfoss A/S, Nordborg, Denmark

[21] Appl. No.: 08/875,556

[22] PCT Filed: Jan. 10, 1996

[86] PCT No.: PCT/DK96/00008

§ 371 Date: Sep. 22, 1997

§ 102(e) Date: Sep. 22, 1997

[87] PCT Pub. No.: WO96/21817

PCT Pub. Date: Jul. 18, 1996

[30] Foreign Application Priority Data

Jan. 12, 1995 [DE] Germany ........................... 195 00 747

[51] Int. Cl.[6] ........................... F16K 31/383

[52] U.S. Cl. ........................... 251/44; 251/63; 251/368

[58] Field of Search ........................... 251/44, 63, 368

[56] References Cited

U.S. PATENT DOCUMENTS

| | | | |
|---|---|---|---|
| 2,480,712 | 8/1949 | Carbon | 251/44 X |
| 3,075,556 | 1/1963 | Hutter et al. | 251/63 X |
| 3,395,890 | 8/1968 | Eckert et al. | 251/368 X |
| 3,762,443 | 10/1973 | Sorenson | 137/625.69 X |
| 3,862,738 | 1/1975 | Stumpmeier | 251/44 X |
| 3,905,393 | 9/1975 | Hartwiig | 137/596.14 |
| 4,337,797 | 7/1982 | Caruso | 137/625.69 X |
| 4,779,836 | 10/1988 | Marklund | 251/44 X |
| 5,222,521 | 6/1993 | Kihlberg | 251/368 X |
| 5,533,706 | 7/1996 | Aurell | 251/44 |
| 5,738,332 | 4/1998 | Perez Corbalan | 251/30.02 X |

*Primary Examiner*—Gerald A. Michalsky
*Attorney, Agent, or Firm*—Lee, Mann, Smith, McWilliams, Sweeney & Ohlson

[57] ABSTRACT

A two-way seat-type valve is provided, having a valve seat which is arranged between a first and a second connection, and having a closure element which co-operates with the valve seat, is arranged in a guide so as to be movable towards the valve seat or away from the valve seat, and which is subjected to a control pressure prevailing in a pressure chamber on the side, remote from the valve seat, of the closure element. A valve of this type should also be able to exhibit good reaction characteristics with water as hydraulic fluid. For this purpose, the closure element is guided seallessly in the guide.

12 Claims, 2 Drawing Sheets

TWO-WAY SEAT-TYPE VALVE

BACKGROUND OF THE INVENTION

The invention relates to a two-way seat-type valve having a valve seat which is arranged between a first and a second connection, and having a closure element which co-operates with the valve seat, is arranged in a guide so as to be movable towards the valve seat or away from the valve seat, and is subjected to a control pressure prevailing in a pressure chamber on the side, remote from the valve seat, of the closure element.

Valves of this type are used as hydraulic valves for controlling fluid flow and fluid pressures. They function without any problem, as long as oil, especially a synthetic hydraulic oil, is used as hydraulic fluid.

For some time, however, attempts have been made to replace the hydraulic oils, especially the synthetic hydraulic oils, by means of water, because of their somewhat questionable properties, from the environmental point of view, and especially of their toxicity. However, water has practically no lubricating properties, and, moreover, in many cases leads to corrosion damage, so that valves of this type wear out relatively quickly, or even seize up, so that they can no longer fulfil their function or can no longer do so to a satisfactory degree.

In the case of a valve of the type mentioned initially (DE 36 37 208 C2), it was therefore proposed to prevent the closure element from coming into contact with the guide by guiding the closure element in the guide by means of guide rings. The gap thereby produced between the closure element and the guide is closed by an additionally provided sealing element. A construction of this type, however, has the drawback that the opening and closing times become longer. The reaction characteristics of the valve therefore become poorer. This excludes the use of such a valve in applications in which it is a question of similar reaction times to those occurring when using oil as hydraulic fluid.

SUMMARY OF THE INVENTION

The problem underlying the invention is that of providing a hydraulic valve, suitable for water, which has good reaction characteristics.

This problem is solved in a valve of the type mentioned initially in that the closure element is guided seal-lessly in the guide.

By this means, a certain leakage is allowed past the closure element in the direction of the pressure chamber. This does indeed entail certain losses, which are relatively small. However, this makes it possible for a fluid layer or a fluid film to build up between the guide and the closure element, which in many cases allows the closure element to slide with low friction in the guide. Moreover, with a construction without seals, improved and more uniform operating behaviour is obtained. In the case of a construction with one or more sealing rings, the opening and closing times may differ from valve to valve. This is attributable on the one hand to scarcely avoidable tolerances with corresponding variations in stresses between the closure element and the guide, and on the other hand to differing wear. Moreover, seals have only a limited service life and change the dynamic characteristics in the course of time, owing to wear. If no seals are used, the dynamic characteristics remain the same over a longer period. This is of importance especially when several valves are connected together in such a way, for example in a bridge, that in the case of a too rapid opening movement or a too slow closing movement of one valve a short-circuit can occur between the pressure source and the pressure sink. Without seals, the speeds once set up can be maintained over a relatively long period.

Preferably, the pressure chamber is connected to a control pressure line by way of a non-return valve opening away from the pressure chamber. When sealing between the closure element and the guide is omitted and a certain leakage is thus allowed past the closure element, this naturally results in certain problems if the two-way seat-type valve is connected to a common control pressure line with other correspondingly constructed valves. In this case, a pressure increase arising in the control pressure line through the leakage in one valve can advance past the closure element into one connection of the other valve. The non-return valve now prevents such an uncontrolled pressure increase in the connection in question of the valve and makes the valve leaktight.

Preferably, the closure element has a bearing portion and a sealing portion, the guide being in the form of a bushing which consists of a material that provides low friction when working in combination with the material of the bearing portion. Because of the permitted leakage between the closure element and the guide, a fluid film is in fact produced which leads to a reduction in the friction between the closure element and the guide. Under unfavourable conditions, however, contact may nevertheless occur between the closure element and the guide. The risks of such contact are reduced to a great extent by means of the material combination described. Even in the case of contact, because of the low-friction working together of the material combination, no problems arise.

In this context, it is especially preferred that the bearing portion is formed of stainless steel and the bushing of a softer metal, especially brass, or a plastics material from the group of high-strength thermoplastic plastics materials based on polyaryletherketones, especially polyetheretherketones, polyamides, polyacetals, polyarylether, polyethyleneterephthalates, polyphenylenesulphides, polysulphones, polyethersulphones, polyetherimides, polyamidimide, polyacrylates, phenolic resins, such as novolak resins, or the like, wherein glass, graphite, polytetrafluoroethylene or carbon, especially in fibre form, can be used as fillers. When using such materials, water may also be used as hydraulic fluid.

Preferably, the sealing portion is formed of a plastics material, and the valve seat consists of a metal. Since the plastics material is generally softer than the valve seat, the valve seat can penetrate into the sealing portion of the closure element. This leads very rapidly to an excellent seal.

It is also preferred that one of the two connections is connected to the pressure chamber by way of a throttle channel which, in particular, passes through the closure element. By way of this throttle channel, hydraulic fluid can additionally pass from that one connection into the pressure chamber and there lead to a pressure increase, the closing force thereby also being intensified accordingly.

In this context, it is especially preferred that the throttle channel connects the connection having the higher pressure loading to the pressure chamber. The pressure in the pressure chamber may accordingly also be higher.

Advantageously, a non-return valve opening towards the pressure chamber is arranged in the throttle channel. This non-return valve prevents a back flow of hydraulic fluid through the throttle channel in the event that the pressure in the pressure chamber is greater than the pressure in the connection in question. A closing pressure once reached is therefore maintained.

In a preferred embodiment, provision is made for both connections to be connected to the pressure chamber, a non-return valve opening towards the pressure chamber being arranged in each connecting line. In such an embodiment it is ensured that the higher of the two pressures prevailing in the connections is always used to produce the closing force. Owing to the fact that in the case of a pressure increase the hydraulic fluid is first diverted into the pressure chamber, there is no risk that a pressure increase in one of the two connections will accidentally open the closure element.

In this context, it is especially preferred that a throttle means common to both non-return valves is arranged between the pressure chamber and the two non-return valves. The higher pressure of the two connections opens the associated non-return valve. This higher pressure is thus applied directly to the outlet of the other non-return valve and prevents it from opening. The fluid from the connection having the higher pressure can then only continue to advance into the pressure chamber, without leading to a pressure increase in the other connection and any further valves that may be connected thereto.

To especial advantage, one of the two connections is in the form of a low pressure connection and the other connection is in the form of a high pressure connection, the fluid pressure from the low pressure connection acting at the end face on the closure element, and the fluid pressure from the high pressure connection acting substantially on the periphery of the closure element. With this embodiment, a radial flow against the closure body is obtained, since the fluid normally flows from the high pressure connection to the low pressure connection, although it is not to be excluded that the pressure at the low pressure connection, under certain operating conditions, may briefly be higher than that at the high pressure connection. The fluid from the high pressure connection surrounds the closure body on all sides, so that the risk of misalignment becomes less. Such misalignment, in the case of contact between the closure element and the guide, leads to a relatively high surface pressure which can no longer be taken up by way of the thin film of water, so that misalignment should be avoided. By means of the flow behaviour produced, however, this risk is drastically reduced.

It is also preferred that at least one of the non-return valves has a stainless steel ball, co-operating with a valve seat of plastics material. With a construction of this type, on the one hand tight sealing of the non-return valve can be achieved. Since the plastics material is softer than the steel ball, the ball will after a short time have "worked in" its corresponding seat in such a way that, effectively, fluid can no longer pass through the closed non-return valve. Owing to the choice of materials, practically no corrosion problems arise.

BRIEF DESCRIPTION OF THE DRAWINGS

The invention is described hereinafter with reference to a preferred exemplary embodiment in conjunction with the drawing, in which.

DESCRIPTION OF THE PREFERRED EMBODIMENTS

Figure 1:
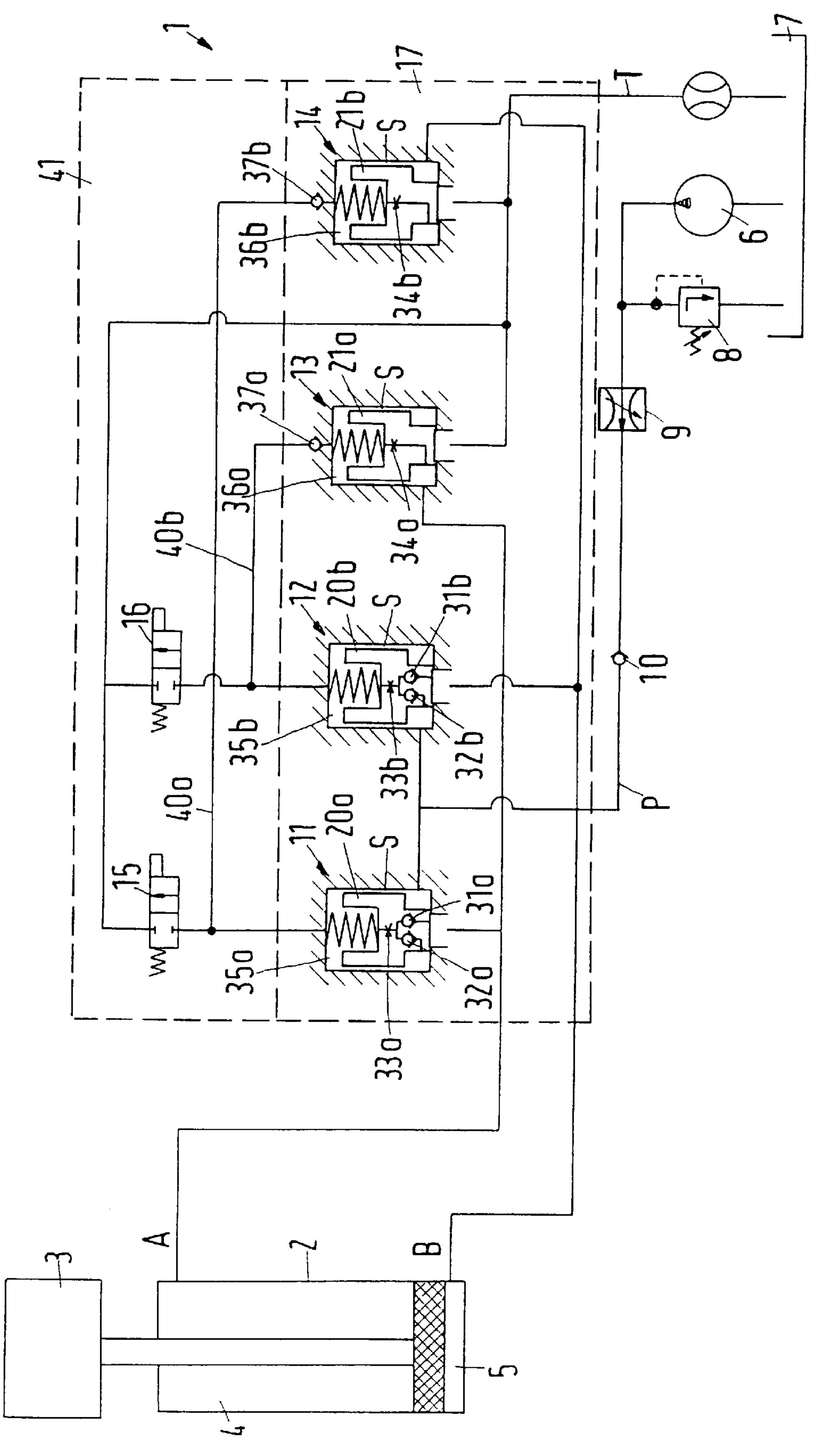
FIG. 1 shows in diagrammatic view a 4/3-way valve built up of a plurality of two-way valves.

FIG. 1 shows diagrammatically a 4/3-way valve 1, thus a valve with four connections and three positions, which serves to control a hydraulic piston motor 2 which is to raise or lower a load 3. For this purpose, the motor 2 has two control lines A and B which open into working chambers 4, 5 of the motor 2. The four-way valve is here arranged in a known manner between a pump 6 which serves as pressure source and a tank 7 which serves as pressure sink. Downstream of the pump 6 are connected a pressure regulator 8 and a flow limiting means 9, as well as a non-return valve 10 opening in the direction of the four-way valve 1. The four-way valve 1 has connections P (to the pump), T (to the tank) and A, B (to the motor 2).

The 4/3-way valve is built up of four two-way valves 11, 12, 13 and 14, two of which communicate with the pump 6, and therefore are designated as pump valves 11, 12, and the other two communicate with the tank 7, and are therefore designated as tank valves 13, 14.

The 4/3-way valve is built up in the manner of a bridge circuit, in which the two-way valves 11 to 14 are arranged in the arms of the bridge, while one diagonal lies between the pump 6 and the tank 7, and the other diagonal lies between the working connections A, B of the motor 2. Accordingly, the individual valves are always operated in pairs, by means of control valves 15, 16, which are in the form of electromagnetic valves and are arranged in a control housing 41. The control valve 15 controls the actuation of the valves 11 and 14, while the control valve 16 controls the actuation of the valves 12 and 13.

Figure 2:
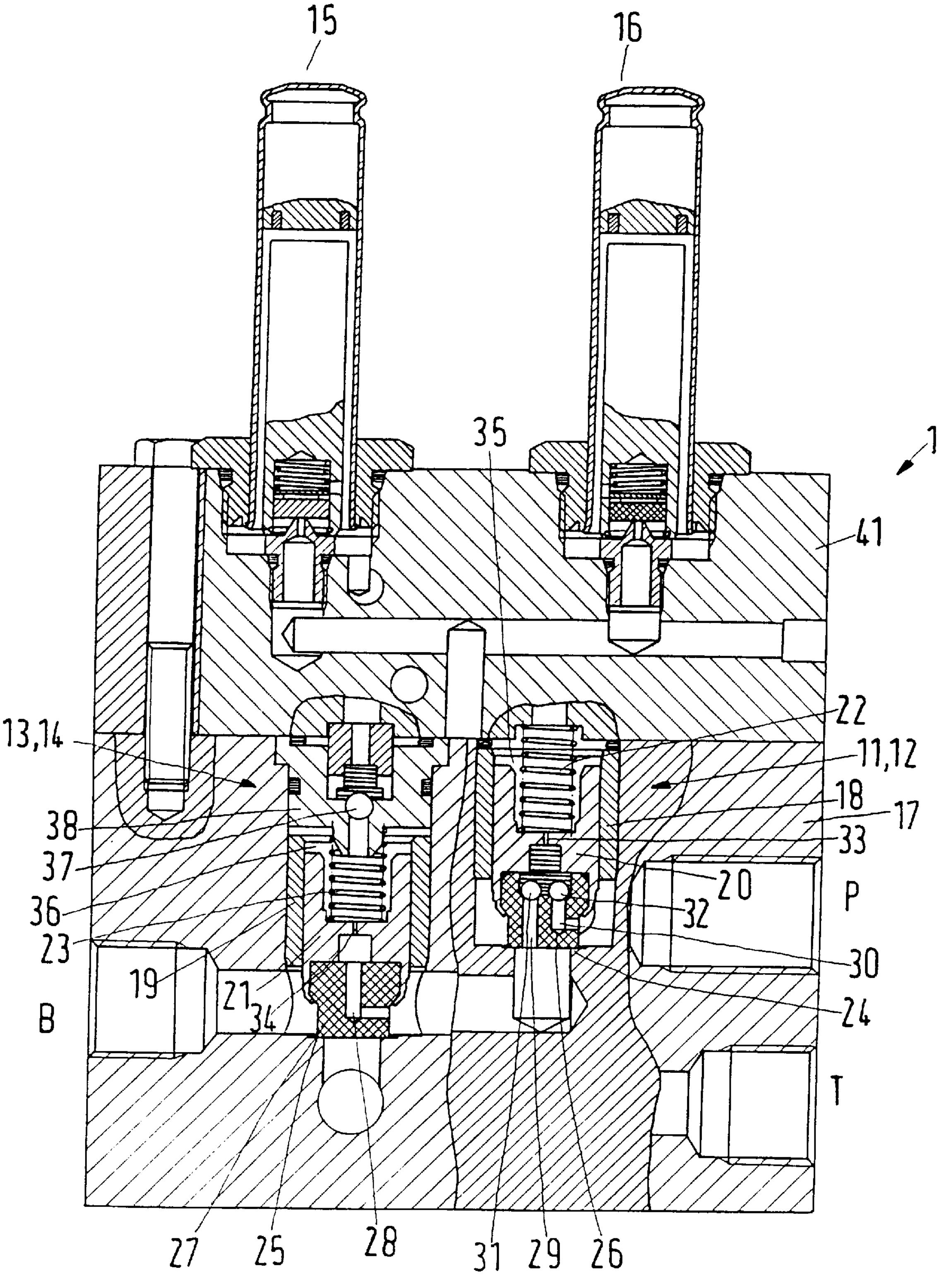
FIG. 2 is a diagrammatic section through a two-way valve.

The construction of the valves 11 to 14 is revealed by FIG. 2.

In a valve housing 17, which is connected to the control housing 41, there is provided for each two-way valve 11 to 14 a bushing 18, 19 which is formed, for example, of brass or of a material from the group of high-strength thermoplastic plastics materials based on polyaryletherketones, especially polyetheretherketones, polyamides, polyacetals, polyarylether, polyethyleneterephthalates, polyphenylenesulphides, polysulphones, polyethersulphones, polyetherimides, polyamidimide, polyacrylates, phenolic resins, such as novolak resins, or the like, wherein glass, graphite, polytetrafluoroethylene or carbon, especially in fibre form, can be used as fillers.

Further, each valve 11 to 14 has a closure element 20, 21 having a bearing portion of stainless steel. The material pairing between the bushing 18, 19 and the closure element 20, 21 is in any case so selected that the two parts can slide with low friction upon each other. Since the valve is to be operated with water as the hydraulic fluid, a further prerequisite is that both materials are corrosion-resistant. Each closure element is subjected by a spring 22, 23 to a closing force which presses the closure element 20, 21 in the direction of a valve seat 24, 25. In order to improve the leak-tightness, the closure element 20, 21 is provided at the end facing towards the valve seat 24, 25 with an insert 26, 27 of plastics material. While the valve seats 24, 25 may likewise be formed of stainless steel and therefore have a certain hardness, the plastics material of the inserts 26, 27 is softer, so that the valve seat can press itself into the insert and therefore results in a tight seal.

The inserts 26, 27 differ between the pump valves 11, 12 and the tank valves 12, 14. The insert 27 of the tank valves 13, 14 has a simple channel 28 which communicates with the corresponding working connection A, B of the motor 2. Since the pressure at this working connection A, B, in operation, is normally higher than at the tank connection T, this connection is also designated as a high pressure connection, while the tank connection T is designated as a low pressure connection.

In the same way, the pump valves 11, 12 have a high pressure connection P which communicates with the pump 6, and a low pressure connection which communicates with the working connections A, B of the motor 2.

The designations "high pressure connection" and "low pressure connection" hereby serve only to differentiate between the two connections. Situations may very likely arise in which the pressure at the low pressure connection is greater than that at the high pressure connection.

In the pump valves 11, 12, the insert 26 has two channels 29, 30 in each of which a non-return valve 31, 32 is arranged. Both non-return valves open away from the connections, and therefore block a back flow of fluid into the high pressure or low pressure connection. The non-return valves 31, 32 are each formed by means of a spring-loaded stainless steel ball, which presses itself into a valve seat in the insert 26. Since the insert 26, as mentioned above, is formed of plastics material, the ball can here, after a short time, shape the valve seat in such a way that the non-return valves are to a great extent leaktight.

Both closure elements 20, 21 have a throttle channel 33, 34, the throttle channel 33 being arranged between the non-return valves 31, 32 and a pressure chamber 35 in the case of the pump valves 11, 12, while the throttle channel 34 is arranged between the channel 28 and a pressure chamber 36 in the case of the tank valves.

In a manner which is not shown, in the control valves 15, 16 there are also throttles leading to the tank, but in any case with a greater resistance than in the closure elements 20, 21, so that the corresponding control pressure can build up.

In series with the tank valves 13, 14 is arranged a further non-return valve which opens away from the pressure chamber 36 and which is formed of a stainless steel ball 37, which is pressed, loaded by springs, into an insert 38 of plastics material which is fixedly arranged in the valve housing 17.

The springs of the non-return valves should be weaker than the springs 22, 23, of the closure elements.

As revealed by FIG. 2, the tank valves 13, 14 and the pump valves 11, 12 are offset axially with respect to one another, so that arranging the conduits without oblique bores is made easier.

The closure elements 20, 21 are guided without seals, therefore seal-lessly, in the bushings 18, 19. In order to make this state of affairs clear, in FIG. 1 a gap s is therefore shown between the guides, formed by the bushing 18, 19, and the closure elements 20, 21. In the diagrammatic view of FIG. 1, this gap s is shown greatly exaggeratedly. In reality it is much smaller. In any case, however, it is of a size such that water, which is here used as hydraulic fluid, can flow past the respective closure element 20, 21.

Since the pressure chambers 35, 36, which in order to differentiate between the two pump valves 11, 12 and the two tank valves 13, 14 are in each case provided with the suffixes a and b, are in each case connected to one another in pairs, it could happen that, in the case of the seal-less construction of the valves 11 to 14, fluid with pump pressure flows past the closure elements 20 of the pump valves 11, 12 into the pressure chamber 35 and thence into the pressure chamber 36 of the tank valves 13, 14. Since the closure elements there are also mounted seal-lessly in the bushes, the pressure could then pass into the high pressure connection, that is to say, supply pressure to the working connections A, B of the motor 2. The non-return valves 37*a*, 37*b*, however, prevent the pressure from the pressure chamber 35 from advancing into the pressure chambers 36. By this means, despite the seal-less guiding of the closure elements, a leaktight 4/3-way valve is obtained.

The 4/3-way valve 1 operates in the following manner: water, which is conveyed by the pump 6 into the pump connection P, flows past the closure elements 20, 21 into the pressure chambers 35, 36, which are connected to one another in pairs in each case by way of a pressure control line 40*a*, 40*b*, and thus presses the closure elements 20, 21 onto the valve seats 24, 25. All two-way valves 11, 12, 13, 14 are thus closed. The fluid can here pass on two paths into the pressure chambers 35, 36, on the one hand through the gap s, the amount passing through being only relatively small here. The major part of the fluid will pass through the throttle channel 33, 34. If it is now desired to move the motor 2 in a certain direction, for example to raise the load 3 in the diagrammatic view of FIG. 1, the pressure in the working connection B of the motor 2 must be increased. For this purpose, the control valve 16 is opened. The pressure chambers 35*b*, 36*a* are now relieved of pressure, since the outlet of the control valves 15, 16 communicates with the tank T. By means of the pump pressure prevailing in the high pressure connection of the two-way valve 12, the closure element 20*b* is raised from the valve seat and water with the pump pressure flows into the working connection B. It is of course a pre-requisite here that the closure element 20 has a pressure engagement surface on which the pressure in the high pressure connection can act.

During the upward movement of the load 3, water is now displaced into the working connection A, passes to the high pressure connection of the two-way valve 13, and there raises the closure element 21*a*, so that the displaced water can flow back to the tank 7. The pressure decrease in the pressure chamber 36*a* is possible because the non-return valve 37*a* opens in the direction of the control valve 16.

If the operation of the motor is now to be terminated, the control valve 16 closes again, so that the pressure in the pressure chambers 35*b* and 36*a* increases. In the case of motors which, as in the case illustrated, may have differing pressures at their working connections A, B, for example, differential cylinders, it may now happen that the two-way valve 13 closes, while the two-way valve 12 is still open. The pump valves 11, 12 are always supplied with the full pump pressure, while the tank valves open only wide enough to allow through the fluid flowing back from the working motor. Since the pressure at the working connection A is higher than at the working connection B, it could now happen that the pressure in the working connection A opens the two-way valve 11. Since, however, the two non-return valves 31, 32 are arranged in the pump valves 11, 12, the higher of the two pressures in the connections separated by means of the valve seat 24 always advances into the pressure chamber 35, in order there to produce the necessary closing force. Also in the case of the differential cylinder shown as the motor 2, therefore, reliable control is possible, even when water, which has no lubricating properties, is used as hydraulic fluid.

The non-return valves 32 furthermore have a certain importance from the safety point of view, in a case in which the following conditions prevail: the valve 1 is in the neutral position, the motor 2 is under load, the non-return valve 10 is not very fluidtight, and the pump 6 is switched off or is defective. In this case, the fluid would flow away from the working connection which was under pressure, directly to the pump connection. The load would descend very rapidly. If the non-return valve 32 is now built into this connection, there is still a connection, by way of the gap s, between the working connection and the pump connection. The fluid flow, however, is kept considerably smaller here.

We claim:

1. Two-way seat-type valve having a valve seat which is arranged between a first and second connection, and having a valve seat which co-operates with the valve seat, the closure element being arranged in a stationary guide so as to be movable towards the valve seat or away from the valve seat, and being subjected to a control pressure prevailing in a pressure chamber on a side of the closure element remote from the valve seat, the closure element being guided seallessly in the guide, one of the first and second connections being connected to the pressure chamber by a throttle channel passing through the closure element, the guide comprising a bushing portion and the closure element having a bearing portion located in the bushing portion, one of the portions being formed of a harder material than the other portion, the portions providing low friction when working in combination with one another, and including a gap between the bearing portion and the bushing portion to allow passage of a hydraulic medium therebetween.

2. Valve according to claim 1, in which the pressure chamber is connected to a control pressure line by way of a non-return valve opening away from the pressure chamber.

3. Valve according to claim 2, in which the non-return valve has a stainless steel ball, co-operating with a valve seat of plastics material.

4. Valve according to claim 1, in which the closure element further has a sealing portion.

5. Valve according to claim 4, in which the bearing portion is formed of stainless steel and the guide consists of a softer metal.

6. Valve according to claim 4 in which the bearing portion is formed of stainless steel, and the guide comprises a plastics material from the group of high-strength thermoplastic plastics materials based on polyetherether-ketones, polyamides, polyacetals, polyarylether, polyethyleneterephthalates, polyphenylenesulphides, polysulphones, polyethersulphones, polyetherimides, polyamidimide, polyacrylates, novolak resins, wherein at least one of glass, graphite, polytetrafluoroethylene and carbon are used as fillers.

7. Valve according to claim 4, in which the sealing portion is formed of a plastics material, and the valve seat consists of a metal.

8. Valve according to claim 1, in which the throttle channel connects a connection having higher pressure loading to the pressure chamber.

9. Valve according to claim 1, in which a non-return valve opening towards the pressure chamber is arranged in the throttle channel.

10. Valve according to claim 1, in which both connections are connected to the pressure chamber, each through a connecting line, a non-return valve opening towards the pressure chamber being arranged in each connecting line.

11. Valve according to claim 10, in which a throttle means common to both non-return valves is arranged between the pressure chamber and the two non-return valves.

12. Valve according to claim 1, in which one of the connections is a low pressure connection and the other connection is a high pressure connection, fluid pressure from the low pressure connection acting an end face on the closure element and the fluid pressure from the high pressure connection acting substantially on the periphery of the closure element.

* * * * *